United States Patent
Courtney et al.

(10) Patent No.: US 12,208,397 B2
(45) Date of Patent: Jan. 28, 2025

(54) PIPETTE TIP DISPOSAL ASSEMBLY

(71) Applicant: RANDOX LABORATORIES LTD, Crumlin (GB)

(72) Inventors: Paul Courtney, Northern Ireland (GB); Martin Reid, Northern Ireland (GB); Stuart Jackson, Northern Ireland (GB); John Lamont, Northern Ireland (GB); Ivan McConnell, Northern Ireland (GB); Peter Fitzgerald, Northern Ireland (GB)

(73) Assignee: RANDOX LABORATORIES LTD, Crumlin (GB)

( * ) Notice: Subject to any disclaimer, the term of this patent is extended or adjusted under 35 U.S.C. 154(b) by 589 days.

(21) Appl. No.: 17/265,441

(22) PCT Filed: Aug. 2, 2019

(86) PCT No.: PCT/GB2019/052178
§ 371 (c)(1),
(2) Date: Feb. 2, 2021

(87) PCT Pub. No.: WO2020/025972
PCT Pub. Date: Feb. 6, 2020

(65) Prior Publication Data
US 2021/0316312 A1    Oct. 14, 2021

(30) Foreign Application Priority Data
Aug. 3, 2018 (GB) .................................... 1812668

(51) Int. Cl.
*B01L 9/00* (2006.01)
*B01L 1/00* (2006.01)
*B25J 9/02* (2006.01)

(52) U.S. Cl.
CPC ................ *B01L 9/543* (2013.01); *B01L 1/50* (2013.01); *B01L 2300/0851* (2013.01); *B01L 2300/0858* (2013.01); *B25J 9/023* (2013.01)

(58) Field of Classification Search
None
See application file for complete search history.

(56) References Cited

U.S. PATENT DOCUMENTS

2015/0044111 A1   2/2015   Peetz et al.
2015/0226759 A1   8/2015   Connolly et al.

FOREIGN PATENT DOCUMENTS

DE   202011050589 U1   10/2011
JP   H08285862 A   11/1996
(Continued)

OTHER PUBLICATIONS

Sep. 17, 2019—(WO) International Search Report and Written Opinion—Appl. No. PCT/GB2019/052178, 10 pages.
Jan. 31, 2019—(GB) Search Report—Appl. No. 1812668.0, 9 pages.

*Primary Examiner* — Paul S Hyun
(74) *Attorney, Agent, or Firm* — Banner & Witcoff, Ltd.

(57) ABSTRACT

There is provided a pipette tip disposal assembly. The assembly comprises a receiving element adapted to support an end of at least one pipette tip, the at least one pipette tip being toppled in use from the receiving element along a first direction; and a container positioned to receive the at least one toppled pipette tip, the at least one pipette tip falling towards a base of the container on being received by the container. The base of the container has a first linear dimension aligned with the first direction corresponding to the length of a pipette tip.

18 Claims, 5 Drawing Sheets

(56) References Cited

FOREIGN PATENT DOCUMENTS

| | | |
|---|---|---|
| JP | H1038897 A | 2/1998 |
| JP | 2007046956 A | 2/2007 |
| JP | 2007064706 A | 3/2007 |
| JP | 2015169639 A | 9/2015 |

PIPETTE TIP DISPOSAL ASSEMBLY

CROSS-REFERENCE TO RELATED APPLICATIONS

This application is a U.S. National Stage application under 35 U.S.C. § 371 of International Application PCT/GB2019/052178 (published as WO 2020/025972 A1), filed Aug. 2, 2019, which claims the benefit of priority to United Kingdom Patent Application No. 1812668.0, filed Aug. 3, 2018. Benefit of the filing date of each of these prior applications is hereby claimed. Each of these prior applications is hereby incorporated by reference in its entirety.

FIELD OF THE INVENTION

The present invention relates to assemblies for the disposal of sample tips in biochemical testing systems.

BACKGROUND TO THE INVENTION

Biochemical analysers often use disposable pipette tips to collect, hold and dispense samples. After pipette tips have been used, they are collected and removed from the analyser. Conventionally, used pipette tips are ejected into a container such as a bin or bag that may be removed from the analyser.

Biochemical analysers are used to perform automated assays that require minimal user interaction while in progress. When the bin or bag into which used pipette tips are ejected becomes full, however, the assay must be paused while the container is removed and replaced. Interruptions of this kind can reduce the speed and efficiency of automated assays and demand attention from the user that would otherwise not be required.

Pipette tips may be disposed of after use, or may alternatively be re-used. The re-use of pipette tips risks contamination between samples, so tips may be cleaned before being returned to the biochemical analyser. Cleaning pipette tips is, however, expensive and time consuming, and so in practice pipette tips are typically disposed of after a single use.

The volume of waste in the form of used pipette tips generated by an analyser can also be difficult to manage. This issue is particularly pertinent when the pipette tips have been used to handle substances that are hazardous or should for any other reason not be exposed to the surrounding environment. The risk of contamination of individual samples, the user and the environment increases the more often a user is required to handle used pipette tips.

It is therefore desirable to limit the need for user interaction during automated assays, and to reduce the risk of contamination between samples and of the user and the environment.

STATEMENT OF THE INVENTION

A pipette tip disposal assembly according to a first aspect comprises: a receiving element adapted to support an end of at least one pipette tip, the at least one pipette tip being toppled in use from the receiving element along a first direction; and a container positioned to receive the at least one toppled pipette tip, the at least one pipette tip falling towards a base of the container on being received by the container, wherein said base of the container has a first linear dimension aligned with the first direction corresponding to the length of a pipette tip.

This pipette tip disposal assembly addresses the challenges described above by enabling the use of a standardised entry mechanism to achieve ordered stacking of pipette tips in a container. The base having a linear dimension matched to the length of a pipette tip encourages the formation of a regular base layer, and encourages subsequent layers introduced by the controlled entry mechanism to continue to stack in an ordered manner.

By causing ejected pipette tips to collect in a regular arrangement, the density at which the tips are packed is increased. This reduces the volume occupied by a given number of ejected pipette tips, and reduces the frequency with which the container collecting the tips must be removed and replaced. A base of the container with the first linear dimension described above Typically the receiving element is at a separation of no more than three times the first linear dimension from the base of the container, though greater separations could alternatively be chosen. As the separation is increased, pipette tips toppled from the receiving element will reach greater speeds at they fall towards the base of the container and may be more likely to rebound and come to rest in a position that disrupts the order of stacking. Limiting the separation between the receiving element and the base of the container has been found to mitigate this effect.

The receiving element is typically at a separation of no less than half the first linear dimension from the base of the container. Smaller separations could also be chosen, but decreasing the separation reduces the number of pipette tips that the container can accept before no more can be added.

The receiving element can take any shape suitable to allow pipette tips to be supported, such as cups or cup-like depressions. Typically, however, the receiving element comprises a planar portion. This allows the planar portion to support the ends of pipette tips while allowing any liquid that is deposited on the receiving element to easily drain from the receiving element. Additionally, the receiving element being planar simplifies the manufacturing requirements for this element.

When the receiving element comprises a planar portion, the planar portion of the receiving element may be at an angle with respect to the horizontal plane. This arrangement assists in the draining of fluid from the receiving element, and thereby helps to mitigate the risk of contamination outside of the assembly. The planar portion being angled also encourages the pipette tips to fall along a particular direction when toppled from the receiving element. Typically the angle is 2 degrees(°. This arrangement has been found to achieve effective draining while also aiding pipette tips in falling along the correct direction.

The receiving element and the container may be connected. This allows the container and receiving element to be moved and transported together. These parts of the assembly both come into contact with used pipette tips and allowing them to be handled in this way mitigates the risk of contamination to other samples and the surrounding environment. Alternatively, the receiving element and the container may be unconnected. This allows the receiving element to be a fixed part, such as a shelf, formed as or connected to a part of a biochemical analyser.

In arrangements in which the receiving element and the container are connected, the receiving element and the container may be a single unitary body. In such arrangements the container and receiving element can be manufactured as a single unit. As an alternative to the receiving element and container being a single unitary body, they could be produced separately and then connected at a later stage.

A guide feature may be formed on the container so as to indicate an orientation of the receiving element. This assists a user in correctly aligning the assembly with respect to a biochemical analyser, thereby ensuring that the assembly can be used effectively by, for example, a Cartesian coordinate robot. The guide feature may be a recess or projection formed on a portion of the container such as a side of the container.

The container typically comprises sides that taper outwardly from the base of the container to an opposing end of the container. This assists in the formation of an interference fit between the container and a corresponding portion of a biochemical analyser adapted to accommodate the container.

The container is typically formed by injection moulding. This provides a simple and cost-effective method of manufacturing the container.

The base of the container typically has a second linear dimension corresponding in magnitude to the first linear dimension. The second linear dimension could be greater, but this would increase the probability of disorder being introduced as a base layer of pipette tips collects on the base of the container, and this in turn would limit the density with which subsequently introduced pipette tips pack. The combination of first and second linear dimensions correspondingly to the length of a pipette tip encourages ordered stacking while allowing the container to have a volume suitable for holding a desired number of used pipette tips.

A biochemical testing system according to a second aspect of the invention comprises: the pipette tip disposal assembly according to the first aspect of the invention, and a delivery mechanism adapted to hold at least one pipette tip in use, wherein the delivery mechanism is configured to deliver the at least one pipette tip to a receiving element of the pipette tip disposal assembly and release the at least one pipette tip so as to cause the at least one pipette tip to topple into the container of the pipette tip disposal assembly.

The delivery mechanism may be further configured to hold the at least one pipette tip at a first separation above the receiving element. This allows the use of a simple release mechanism, such as one in which the pipette tips are dropped onto the receiving element under gravity.

Typically, when releasing the at least one pipette tip, the delivery mechanism is further configured to: position the at least one pipette tip such that an end of the at least one pipette tip is supported by the receiving element, and maintain contact with the at least one pipette tips so as to retain the at least one pipette tip in place on the receiving element. This allows the pipette tips to be toppled in a consistent and controlled manner, thereby improving the chances of achieving ordered stacking. Releasing the at least one pipette tip may further comprise the delivery mechanism applying a force to the at least one pipette tip so as to cause the at least one pipette tip to be toppled along the first direction. The application of a force by the delivery mechanism directs the toppling of the pipette tips, further increasing the likelihood of achieving ordered stacking.

The delivery mechanism typically comprises a Cartesian coordinate robot. Such a robot can be controlled to automatically position pipette tips on the receiving element and cause them to topple along the first direction. This may be achieved by, for example, a movement of the robot in the first direction.

The system may comprise a recess adapted to accommodate the container. The recess is typically adapted to form an interference fit with the container when accommodating the container. The recess may have an element adapted to cooperate in use with the guide feature to determine an orientation of the receiving element when accommodating the container. As set out above, the guide feature may be a recess or a projection. The element of the recess may be complementary to the guide feature, for example by including a corresponding projection or recess respectively.

BRIEF DESCRIPTION OF FIGURES

An example pipette tip disposal assembly will now be described in detail with reference to the following figures.

DETAILED DESCRIPTION

Some biochemical analysers use disposable pipette tips to hold liquid samples. When such pipette tips have been used and are no longer needed, they are disposed of.

Typically pipette tips of different lengths can be used. In the example described herein two different lengths are used, and the dimensions of some structural features are described herein in terms of a length of the longer variety by reference to, for example, "the length of a pipette tip". Pipette tips of the shorter variety have a length approximately half that of the longer variety. In this example, pipette tips of the longer variety have a length of approximately 98 millimetres (mm) and a capacity of approximately 1000 microlitres (μL), and those of the shorter variety have a length of approximately 58 mm and a capacity of approximately 50 μL.

Figure 1:
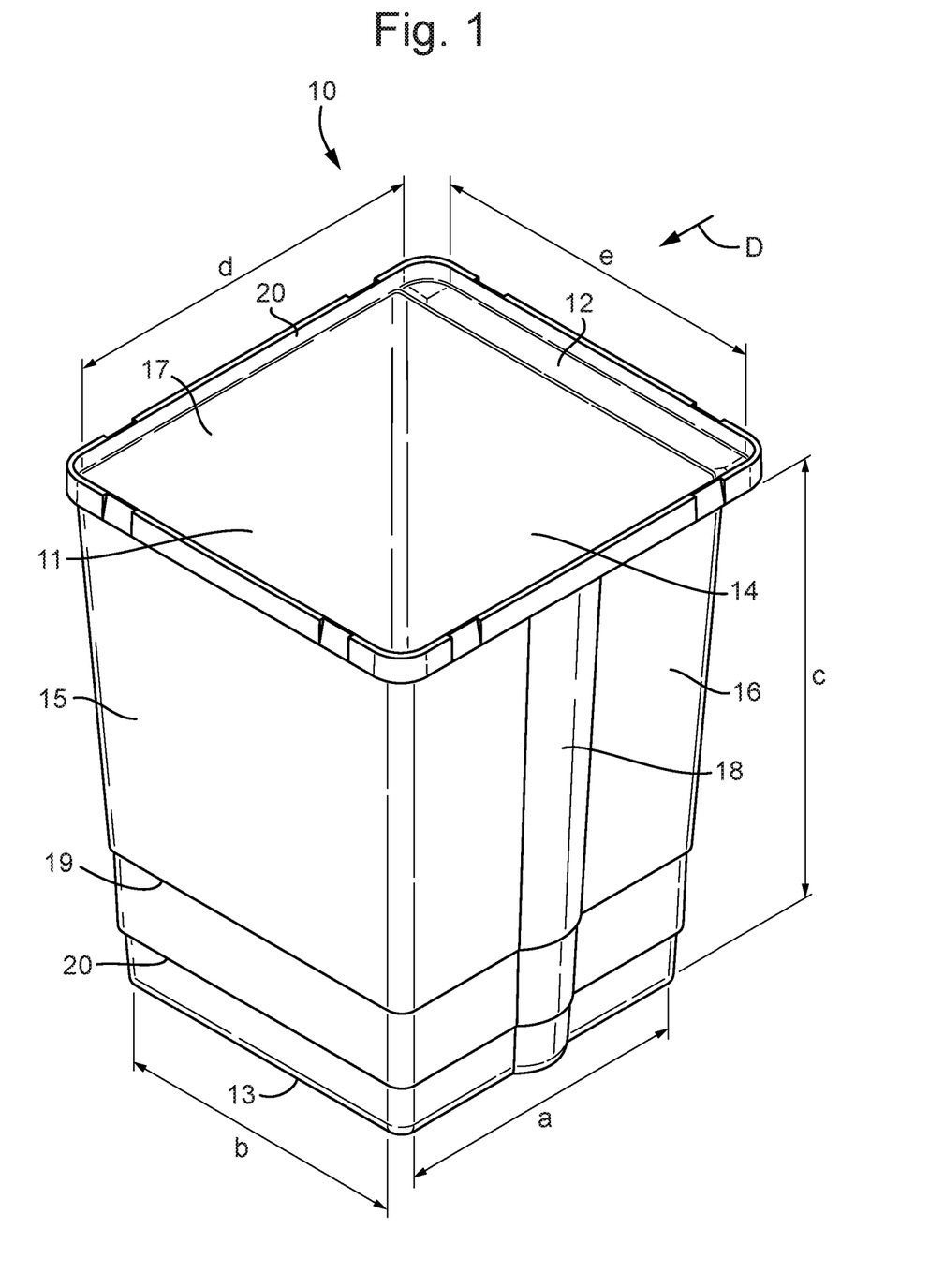
FIG. 1 shows a perspective view of a pipette tip disposal assembly according to an example of the present invention.

A pipette tip disposal assembly is generally illustrated at 10 in FIG. 1. The assembly 10 includes a container 11 adapted to hold a plurality of used pipette tips 30 (shown for example in FIG. 2).

The container 11 has a generally square base 13 whose internal sides are each of a length corresponding to the length of a pipette tip. By this we mean that the length of each internal side is no more than about 10 mm longer than a pipette tip of the longer variety, and the sides in this example are approximately 5 mm longer than the length of the tip. A first linear dimension and a second linear dimension of the base are indicated by the distances a-a and b-b respectively and represent the internal dimensions of the base 13 of the container 11.

The container has four walls extruding from the base 13 to an opening of the container 11 at an opposite end of the container 11 to the base 13. The walls include a first wall 14, a second wall 15 opposite the first wall 14, and two side walls 16, 17. The walls are upstanding and taper outwardly from the base 13. At the opening there is a rim providing a flanged portion extending laterally outward from three of the walls. The rim is provided for each wall except the second wall 15.

For the first wall 14, at the opening the flanged portion provides a receiving element in the form of a shelf 12. The shelf 12 is inclined at an angle of 2° to the horizontal (i.e. at 2° to the plane of the base 13). In this example the shelf 12 extends approximately 10 mm from the first wall to the edge of the container.

The height of the walls, which in this example corresponds approximately to the separation of the shelf 12 and the base 13, is indicated by the distance c-c. In this example, this distance is approximately twice the length of a pipette tip 30. The dimensions given in this example allow the container 11 to hold approximately 384 pipette tips 30 in a hexagonal close-packed arrangement.

The opening of the container 11 has internal dimensions d-d and e-e, which are each approximately 15 mm greater than the corresponding internal dimensions a-a and b-b of the base 13.

A projecting guide feature 18 is formed in one side wall 16 of the container. This indicates the orientation of the shelf 12 and assists a user when positioning the assembly 10 for use.

The walls 14, 15, 16, 17 are formed so as to have two lateral steps 19, 20 each spanning the perimeter of a portion of the walls 14, 15, 16, 17.

Surrounding the rim of the container 11 is an upstanding wall 20. This wall also extends along the end of the second wall 15 at the opening of the container 11. The upstanding wall 20 is adapted to accommodate a lid (not shown) of dimensions matching those of the area enclosed by the vertical wall 20. Such a lid is able to be used to seal the container after the container has been filled with pipette tips 30, and thereby reduces the possibility of any fluid collected on the inside of the container 11 from contaminating the surrounding environment. The vertical wall 20 also reduces the likelihood of fluid on the shelf 12 from escaping the assembly 10.

In this example, all of the elements illustrated in, for example, FIG. 1, are formed as a single unitary body, which may is manufactured by an injection moulding technique.

The pipette tip disposal assembly 10 is arranged to collect pipette tips 30 in a biochemical testing system. In the biochemical testing system, pipette tips 30 are used to hold samples that are delivered to various parts of the system to follow a predetermined assay and then, once used, delivered to the pipette tip disposal assembly 10.

The biochemical testing system includes an aperture (not shown) adapted to accommodate the pipette tip disposal assembly 10. In this arrangement, an interference fit is formed as the container 11 is urged into the aperture under the influence of gravity. The steps 19, 20 on the sides of the container 11 cause the container 11 to assume a level position. The aperture is formed so as to only permit the container 11 to be inserted at a particular orientation determined by the position of the projecting guide feature 18. This is achieved by one side of the aperture having a recess (not shown) that has a shape complementary to the guide feature 18 of the container. Accordingly, the container only fits into the container when the guide feature and the recess are aligned.

The biochemical testing system includes a delivery mechanism 200 capable of holding at least one pipette tip 30 and delivering the at least one pipette tip 30 to the pipette tip disposal assembly 10. In the example shown in the figures, the delivery mechanism 200 is capable of holding four pipette tips. This delivery mechanism 200 includes a Cartesian coordinate robot adapted to hold and transport pipette tips 30. Such a robot is capable of moving along three orthogonal axes.

Figure 2:
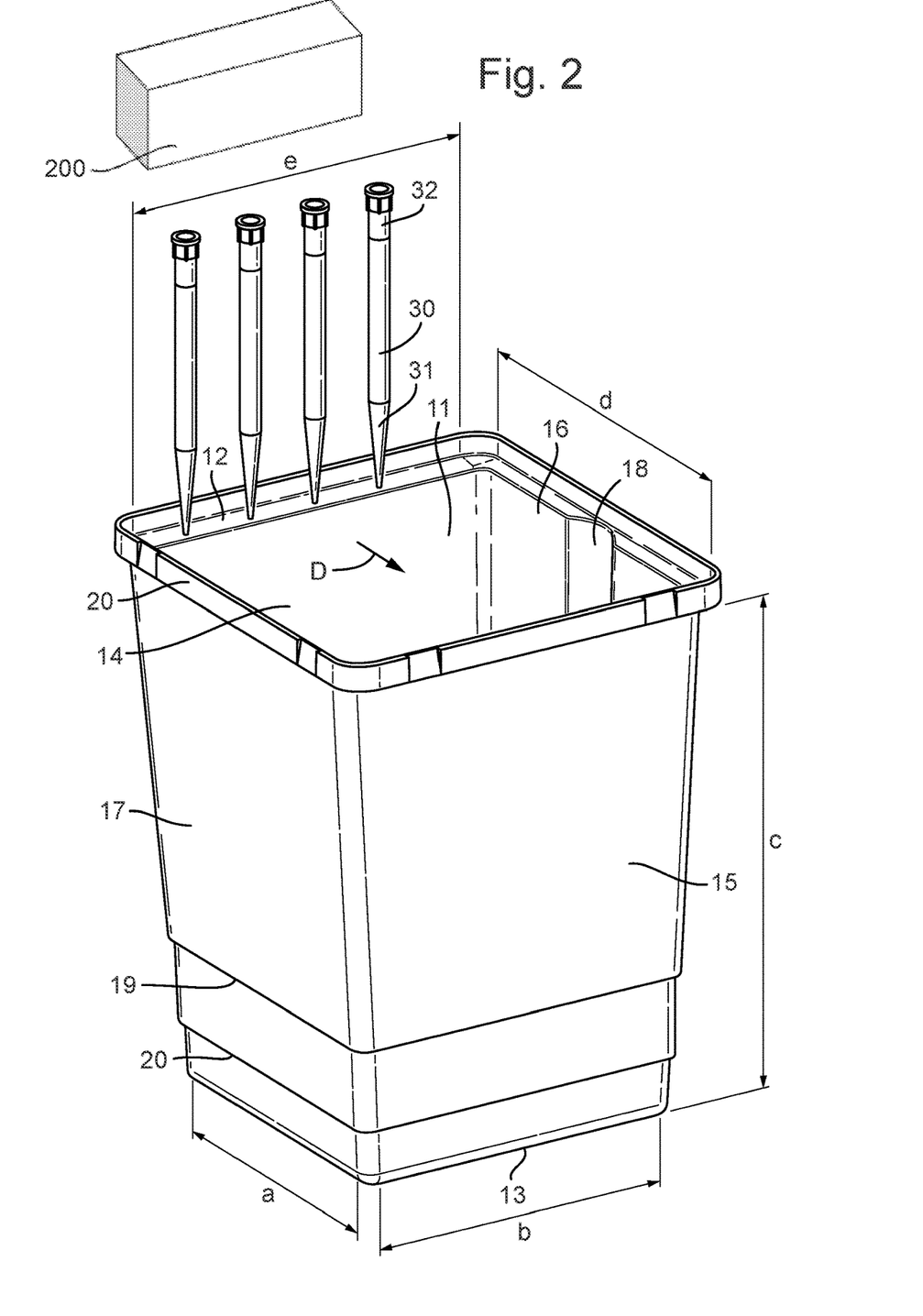
FIG. 2 shows a further perspective view of the pipette tip disposal assembly of FIG. 1 along with pipette tips in a supported position.

To dispose of used pipette tips 30 with the pipette tip disposal assembly 10, the robot brings the pipette tips 30 to the assembly and holds the pipette tips 30 in a row at a small separation above the shelf 12. The pipette tips 30 are then released such that the pipette tips 30 drop down and a lower end portion 31 of each of the pipette tips 30 comes into contact with the shelf 12. Due to the separation between the tips 30 and the shelf 12 before the tips are released (typically less than 5 mm), the robot maintains loose contact with an opposing end portion 32 of each of the pipette tips 30. This maintains the pipette tips 30 in a substantially upright position on the shelf 12. FIG. 2 shows this arrangement with four pipette tips 30 supported upright on the shelf 12 by the robot (not shown). Although FIG. 2 shows the pipette tips 30 arranged with a regular spacing between adjacent pipette tips 30, a variety of separations may be used.

Once the pipette tips 30 have been positioned upright on the shelf 12 by the robot, the robot is moved along a first direction as is indicated by the arrow D in FIG. 1. This applies a lateral force to the pipette tips 30 supported on the shelf 12. Due to the loose contact between the robot and the pipette tips, this causes the ends 32 of the tips in contact with the robot to be moved in the first direction D, thereby pivoting the tips around the ends 31 supported on the shelf. As the tips 30 are pivoted they come out of contact with the robot, thereby completing the release of the tips 30. This in turn causes the pipette tips 30 to topple along the first direction D and fall into the container 11. Once the robot is out of contact with the pipette tips 30, it comes to a stop at a position above the container that is approximately equidistant from the first wall 14 and the second wall 15. In this example, this occurs when the pipette tips are at an angle approximately 45° in relation to the container.

Figure 3:
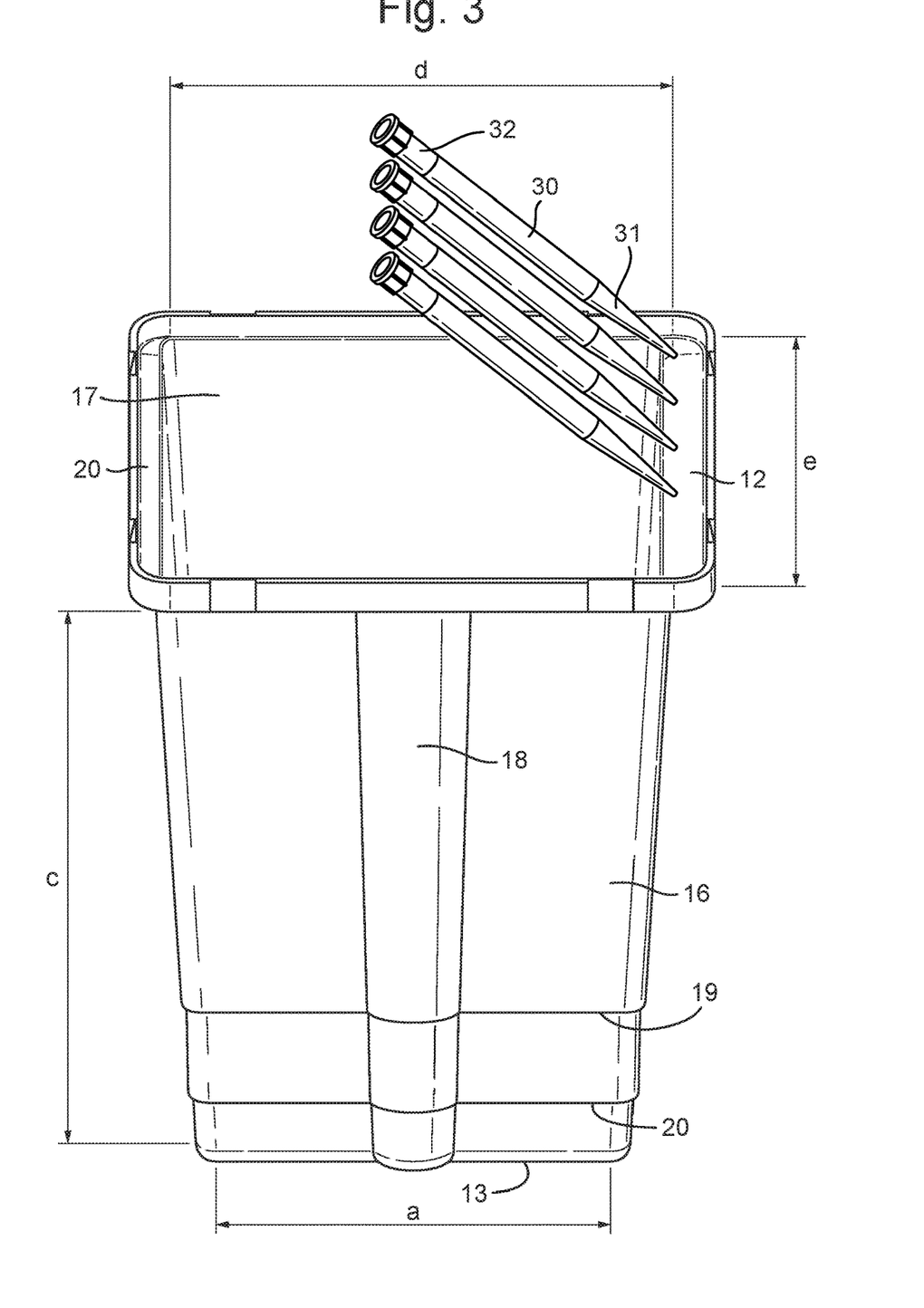
FIG. 3 shows an additional perspective view of the pipette tip disposal assembly of FIG. 1, and pipette tips in a toppling position.

FIG. 3 illustrates four pipette tips 30 being toppled from the shelf 12 of the assembly 10. At the instant shown in this figure, the pipette tips 30 are out of contact with the robot and are able to fall under the influence of gravity towards the base 13 of the container 11. The speed at which the robot moves is chosen such that the most ordered pattern of stacking is achieved. In this example the robot moves at approximately 100 mm per second (mm/s).

FIGS. 2 and 3 both illustrate the use of the assembly 10 solely with pipette tips 30 of the longer variety, though as mentioned above the assembly may also be used to collect pipette tips 30 of the shorter variety (not shown). For example, ordered stacking would still be achieved if one of the four pipette tips 30 illustrated were replaced with a pipette tip of the shorter variety. It is of course not necessary to use exactly four pipette tips 30 each time tips are to be disposed of using the assembly. Indeed, the assembly 10 would function correctly with more or fewer tips than this number.

The pipette tips 30 are caused to fall in such a way that they land approximately parallel to the base 13 of the container 11. This is achieved by limiting the speed at which the tips 30 are toppled by the robot and the depth of the container 11. This minimises the time between the first instant at which each pipette tip 30 collides with the base 13 of the container 11 and that at which the pipette tips 30 ultimately come to rest, thereby reducing the chance of disorder developing as the tips 30 are introduced to the container 11.

As the pipette tips 30 are pushed along the first direction D by the robot, they begin to rotate. As explained above, it is preferable that the pipette tips land approximately parallel with the base 13 of the container 11, so a rotation of at least approximately 90° is desirable. If, however, the rate at which the pipette tips 30 are rotating as they collide with the base 11 is too great, then the pipette tips 30 may rebound in such a way that can introduce disorder into the pattern of stacking. As mentioned above, it is preferable that the force applied by the robot is sufficient only to cause the minimum rotation necessary to cause the pipette tips 30 to fall flat onto the base 13, i.e. approximately 90° only.

The first linear dimension of the base 13 is closely matched to the length of the pipette tips 30. This means that movement of pipette tips 30 that land on the base 13 approximately parallel to the first direction D will be restricted by the first wall 14 and the second wall 15 of the container, thereby preserving the alignment of the tips 30 on the base 13. This allows a first ordered layer of pipette tips 30 to be formed on the base 13. Once a first ordered layer of pipette tips 30 has been formed on the base 13 of the container 11, subsequently introduced pipette tips 30 will typically to come to rest in the gaps between those pipette tips 30 already in the container because they will naturally adopt a close-packed arrangement due to the uniformity of the tips and the consistent alignment. In this way, an ordered stack of pipette tips 30 is formed as successive groups of tips are toppled into the container 11.

Figure 4:
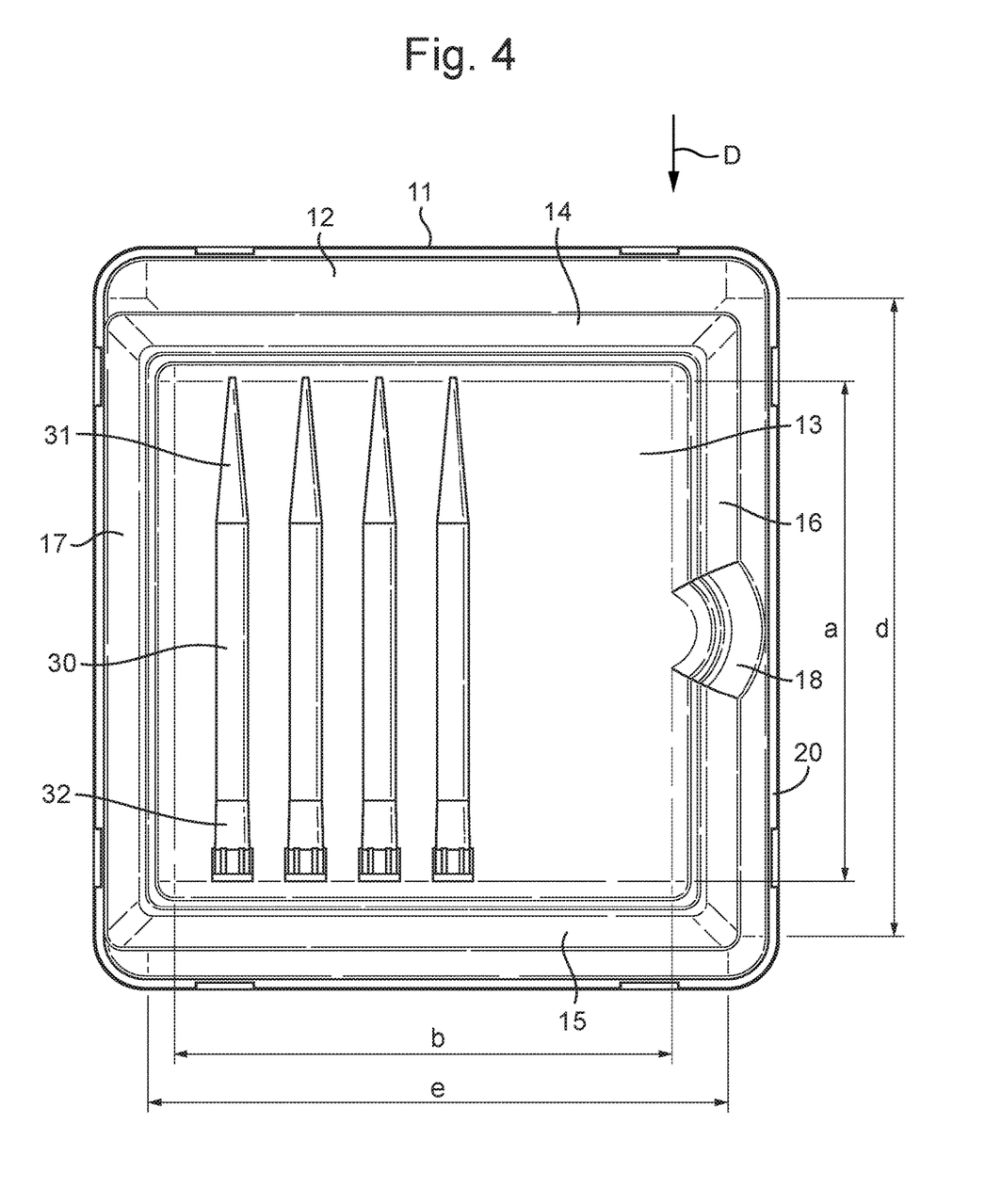
FIG. 4 shows a plan view of a pipette tip disposal assembly with pipette tips held by a container of the assembly.
Figure 5:
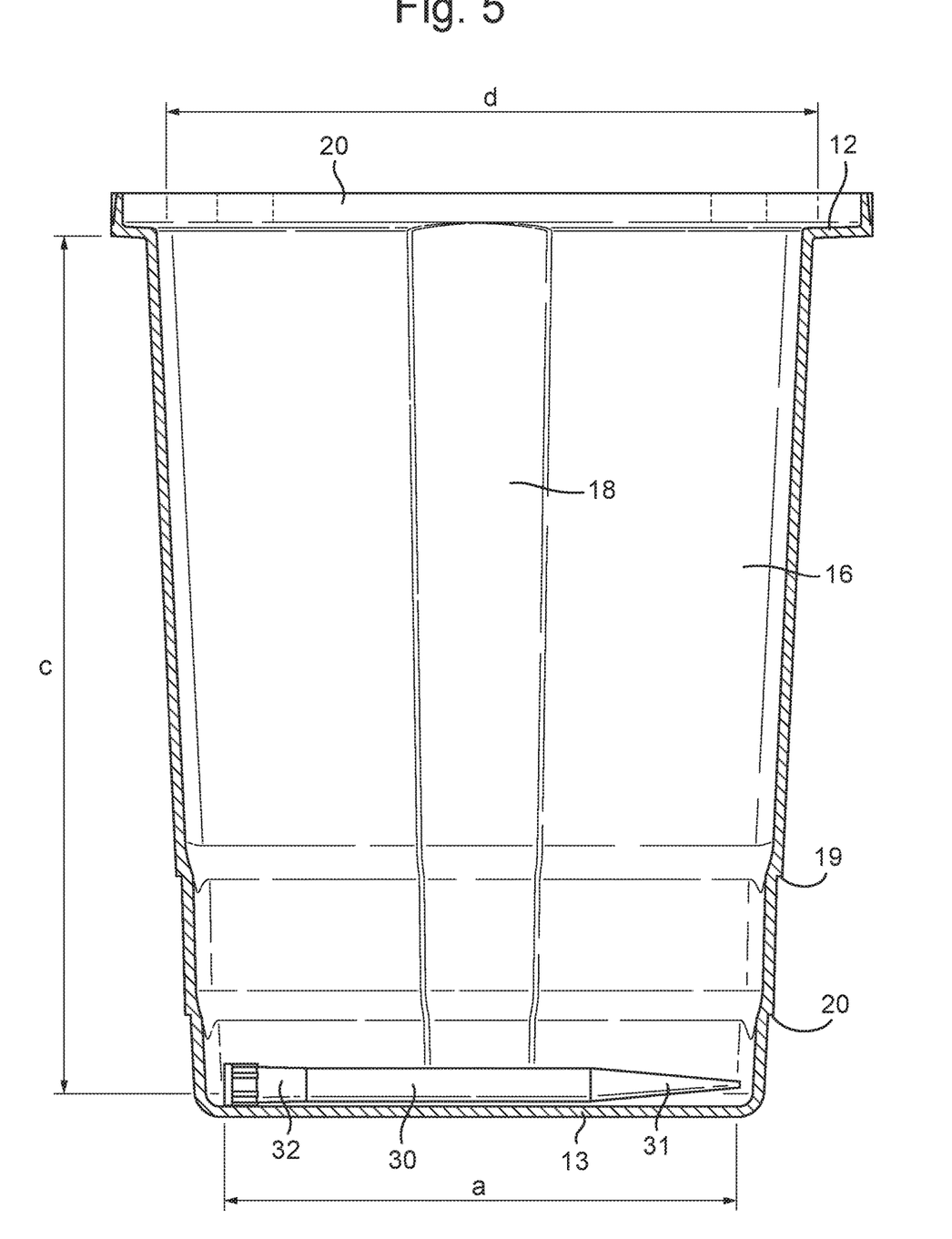
FIG. 5 shows a side view of the pipette tip disposal assembly of FIG. 1, with a pipette tip shown inside a container of the assembly.

FIG. 4 illustrates a plan view of the assembly 10 after four pipette tips 30 have been toppled from the shelf 12 and have landed on the base 13 in an ordered arrangement. The first end portions 31 of the pipette tips that were in contact with the shelf 12 are facing the first wall 14 and the opposing ends 32 of the pipette tips are facing the second wall 15. FIG. 5 shows a side view of this, showing the pipette tips 30 located on the base of the container on their sides.

The invention claimed is:

1. A biochemical testing system comprising:
   at least one pipette tip;
   a pipette tip disposal assembly comprising:
      a receiving element adapted to support an end of the at least one pipette tip, the at least one pipette tip being toppled in use from the receiving element along a first direction; and
      a container positioned to receive the at least one toppled pipette tip, the at least one pipette tip falling towards a base of the container on being received by the container,
      wherein said base of the container has a first linear dimension aligned with the first direction, the first linear dimension corresponding to the length of one of the at least one pipette tip; and
   a delivery mechanism adapted to hold the at least one pipette tip in use, wherein the delivery mechanism is configured to deliver the at least one pipette tip to the receiving element of the pipette tip disposal assembly and release the at least one pipette tip so as to cause the at least one pipette tip to topple into the container of the pipette tip disposal assembly along the first direction.

2. The biochemical testing system of claim 1, wherein the receiving element is at a separation of no more than three times the first linear dimension from the base of the container.

3. The biochemical testing system of claim 1, wherein the receiving element is at a separation of no less than half the first linear dimension from the base of the container.

4. The biochemical testing system of claim 1, wherein the receiving element comprises a planar portion.

5. The biochemical testing system of claim 4, wherein the planar portion of the receiving element is at an angle with respect to the horizontal plane.

6. The biochemical testing system of claim 5, wherein the angle is 2 degrees.

7. The biochemical testing system of claim 1, wherein the receiving element and the container are connected.

8. The biochemical testing system of claim 7, wherein the receiving element and the container are a single unitary body.

9. The biochemical testing system of claim 1, wherein a guide feature is formed on the container so as to indicate an orientation of the receiving element.

10. The biochemical testing system of claim 1, wherein the container comprises sides that taper outwardly from the base of the container to an opposing end of the container.

11. The biochemical testing system of claim 1, wherein the base of the container has a second linear dimension corresponding in magnitude to the first linear dimension.

12. The system of claim 1, wherein the delivery mechanism is further configured to hold, when delivering the at least one pipette tip, the at least one pipette tip at a first separation above the receiving element.

13. The system of claim 1, wherein when releasing the at least one pipette tip, the delivery mechanism is further configured to:
   position the at least one pipette tip such that an end of the at least one pipette tip is supported by the receiving element, and
   maintain contact with the at least one pipette tip so as to retain the at least one pipette tip in place on the receiving element.

14. The system of claim 13, wherein releasing the at least one pipette tip further comprises the delivery mechanism applying a force to the at least one pipette tip so as to cause the at least one pipette tip to be toppled along the first direction.

15. The system of claim 1, wherein the delivery mechanism comprises a Cartesian coordinate robot.

16. The system of claim 1, further comprising a recess adapted to accommodate the container.

17. The system of claim 16, wherein the recess is adapted to form an interference fit with the container when accommodating the container.

18. The system of claim 16, wherein:
   a guide feature is formed on the container so as to indicate an orientation of the receiving element; and
   the recess has an element adapted to cooperate in use with the guide feature to determine an orientation of the receiving element when accommodating the container.

* * * * *